United States Patent [19]

Bodell

[11] Patent Number: 4,768,186
[45] Date of Patent: Aug. 30, 1988

[54] MULTIPLEX TRANSMISSION OF ANALOG SIGNALS BY FIBER OPTIC CHANNEL

[75] Inventor: Donald H. Bodell, Trumbull, Conn.

[73] Assignee: Pirelli Cable Corporation, Union, N.J.

[21] Appl. No.: 828,293

[22] Filed: Feb. 11, 1986

[51] Int. Cl.⁴ ............................................... H04J 1/20
[52] U.S. Cl. ....................................... 370/3; 455/615
[58] Field of Search ..................... 455/615, 69; 370/1, 370/3, 4, 69.1, 74, 120, 122

[56] References Cited

U.S. PATENT DOCUMENTS

| | | | |
|---|---|---|---|
| 2,924,703 | 2/1960 | Sichak et al. | 455/69 |
| 3,087,065 | 4/1963 | Mutschler | 370/1 |
| 3,566,127 | 2/1971 | Hafner | 455/606 |
| 4,004,078 | 1/1977 | Gorog | 455/612 |
| 4,061,577 | 12/1977 | Bell | 358/142 |
| 4,367,548 | 1/1983 | Cotten, Jr. et al. | 370/3 |
| 4,441,180 | 4/1984 | Schüssler | 370/3 |

FOREIGN PATENT DOCUMENTS

| | | | |
|---|---|---|---|
| 3128182 | 2/1983 | Fed. Rep. of Germany | 370/1 |
| 60-212047 | 10/1985 | Japan | 370/69.1 |

OTHER PUBLICATIONS

Altman et al.-Fiber Optics for the Shipboard-Conf. Proc. of the Soc. Photo Opt Instrumentation Engs-Wash., DC-Mar. 28, 29, 1978-SPIE vol. 139, Guided Wave Optical Systems and Devices, 1978, pp. 12-18.
Haynie-Multispeed Multiplexers-Record AT&T Bell Labs-vol. 61, #10, Dec. 1983, 6 pages.
GTE Lenkurt Demodulator-"FDM Modulation Plans"-Sep. 1973, 11 pages.
L'Echo des Recherches (France)-Jul. 1977-pp. 24-31, No. 89.

*Primary Examiner*—Douglas W. Olms
*Attorney, Agent, or Firm*—Brooks Haidt Haffner & Delahunty

[57] ABSTRACT

A communication system in which analog signals are multiplexed and then converted into frequency modulated signals which are applied to the laser of an optical transmitter to intensity modulate the laser output. The laser output is supplied to one end of an optical fiber, the other end of which is connected to an optical receiver. The output signals of the optical receiver are applied to a frequency demodulator, and the output signals of the frequency demodulator are demultiplexed to provide the corresponding analog signals. The system may include pilot tone signals for remote monitoring of conditions at an unmanned station, and preferably, some of the multiplexed signals are emphasized relative to the other signals prior to application to the frequency modulator and are correspondingly deemphasized at the frequency demodulator output.

8 Claims, 4 Drawing Sheets

MULTIPLEX TRANSMISSION OF ANALOG SIGNALS BY FIBER OPTIC CHANNEL

The present invention relates to apparatus for the transmission of multiplexed analog signals from a first point to a second point where they are received and demultiplexed, the transmission from the first point to the second point being by way of a single mode optical fiber cable.

In telephone systems, it is the practice to transmit multiplexed, amplitude modulated signals from a first station, or node, to a second station, or node, by means of wires, coaxial conductor cables or radiated electromagnetic energy at microwave frequencies. Such signals include voice signals, switching signals, data signals and video signals, and the stations may include switching equipment. However, wires and coaxial cable systems have a relatively limited frequency range and distance transmission capacity, and the frequency range available for radiated electromagnetic energy systems is limited by government regulations. Therefore, the capacity of such systems is rapidly being reached if not already reached.

In a typical station for transmitting analog signals, the voice and other signals are superimposed on different carrier frequencies by amplitude modulation to form a group of amplitude modulated carriers, e.g. 12 amplitude modulated carriers. Five of such groups are combined into a super group and then, ten of such super groups are combined in a master group, in a known manner, to provide 170 amplitude modulated carriers which carry 600 channels of signal information. Such carriers may be either transmitted to another station without further modification or may be combined with similarly modulated carriers and used to amplitude modulate another carrier at a much higher frequency, e.g. the output of a microwave radio transmitter.

In a typical receiving station, the reverse processing of the carriers is carried out. In other words, the amplitude modulated carriers are demultiplexed which results in 600 channels of analog signals. If the receiving station has been converted to a digital signal responsive station, the analog signals are converted to digital signals and are subsequently processed in a conventional manner.

Telephone companies are gradually converting such analog stations and telephone exchanges to digital operation in order to obtain the advantages thereof. However, such conversions are relatively expensive, and there still are many analog signal stations which transmit to and receive from other stations which process analog signals or digital signals. It is expected that it will take several years before all stations will transmit and receive digital signals, and in the meantime, it is highy desirable to increase the transmission capacity between an analog signal transmitting station and other stations without increasing the number of lines, cables or radio links therebetween which can be useless at a later date.

The advantages of an optical fiber cable as a transmission medium are well known in the art, and they include large signal transmission capacity for a small size, freedom from electromagnetic interference, and lack of electromagnetic radiation. This latter feature eliminates the need for restricting the band width of the transmitted signals to the relatively narrow band width set forth for radio transmissions by government regulations and permits the use of wide band frequency modulation to improve the signal-to-noise ratio at the receiving end. It is known in the art to transmit digital signals from one point to another by optical fiber cables.

One object of the invention is to increase the signal transmission capacity between a first station having analog signal processing equipment and second station without a substantial modification of the analog signal processing equipment.

Another object of the invention is to accomplish said one object with the installation of equipment which can be utilized after the analog processing equipment in the first station has been modified or replaced so as to provide digital signals for transmission from the first station to another station.

A further object of the invention is to provide high quality transmission of signals between stations with a transmission medium which requires less space than wires or coaxial conductor cables.

In accordance with the preferred embodiment of the invention, a master group of amplitude modulated carriers are supplied to a frequency modulator which supplies an output signal modulated in frequency in accordance with the amplitudes of the carriers. The output of the frequency modulator or the frequency modulations of a plurality of master groups is supplied to an analog optical transmitter to modulate in intensity the output of a laser optical source, the output of the optical source being transmitted over an optical fiber cable extending to a receiving station having an optical receiver. The frequency modulated signals received by the optical receiver are demodulated and the resulting analog signals are processed in a conventional manner at the receiving station. It will be noted that with the system of the invention, it is necessary to add only an optical fiber transmitter, an optical fiber receiver, a frequency modulator, a frequency demodulator and an optical fiber cable to the typical analog systems described hereinbefore to obtain the advantages of optical fiber transmission between stations, and the optical fiber cable remains useful whenever an analog system is converted to a digital system.

The preferred embodiment of the invention also includes preemphasis means between the master group signal source and the frequency modulator for reducing the magnitude of harmonics and improving the signal-to-noise ratio. Also, a pilot carrier signal is transmitted over the optical fiber cable for monitoring, adjustment and alarm purposes.

Other objects and advantages of the present invention will be apparent from the following detailed description of the presently preferred embodiments thereof, which description should be considered in conjunction with the accompanying drawings in which.

Figure 4:
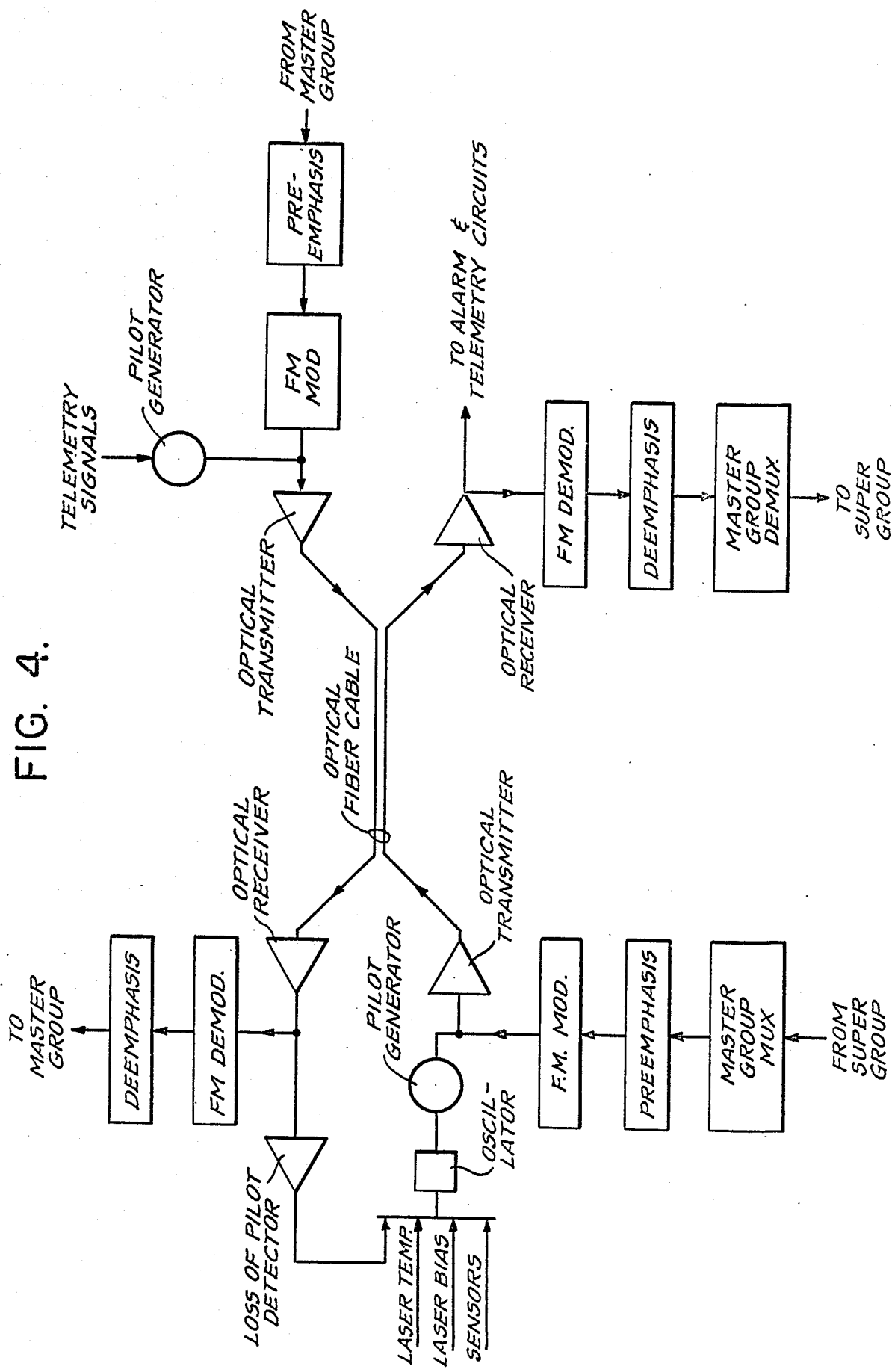
Figure 5:
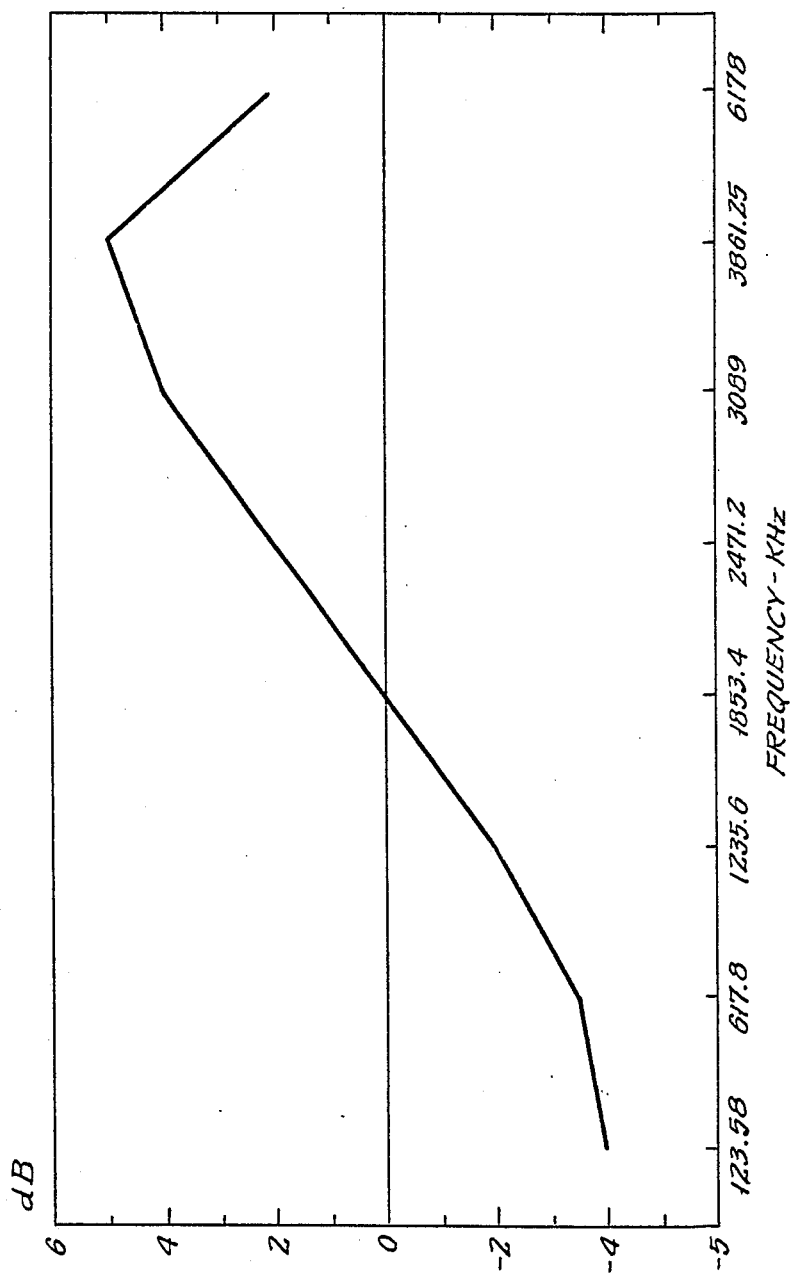

FIG. 4 is a block diagram of the system of the invention for transmitting signals in both directions between a pair of stations and for monitoring the conditions at one of the stations from the other station in the event that said one station is unmanned; and FIG. 5 is a preemphasis-deemphasis graph illustrating the manner in which the master group signals may be altered for improving signal-to-noise ratio at the receiving station.

Figure 1:
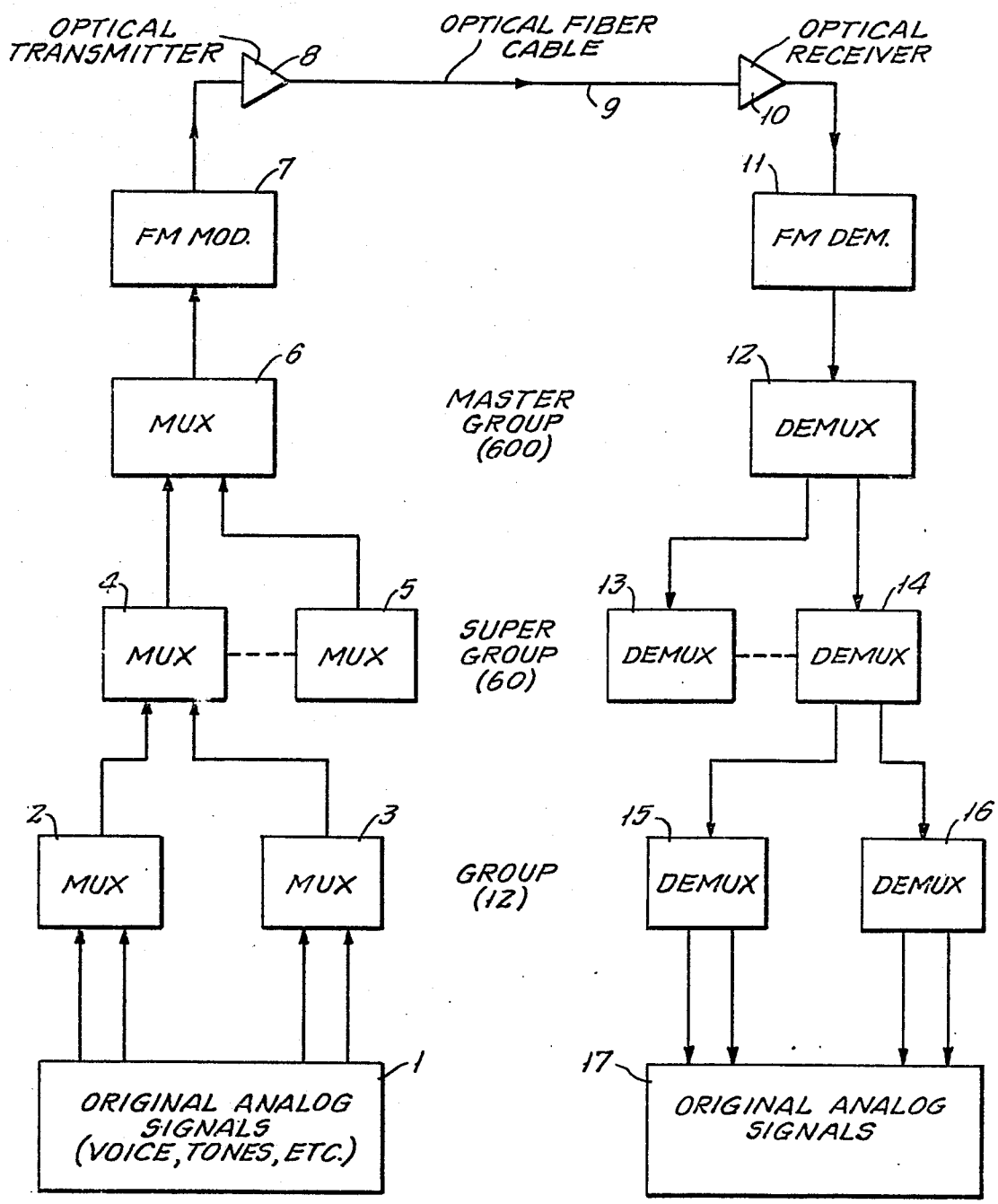
FIG. 1 is a block diagram of the basic system of the invention for transmitting signals from a first station to a second station.

FIG. 1 is a block diagram of the combination of the apparatus of the invention with apparatus already existing in a typical telephone station. The already existing apparatus includes at the transmitting end a plurality of sources of analog signals, represented by the block 1, which may include voice signals, tone signals, data signals, etc. For example, the block 1 may include five groups of twelve voice signal channels, each voice channel having a signal frequency range of the order of 300 to 4300 Hz.

By five conventional group multiplexing means (MUX), only two of which, designated by the reference numerals 2 and 3, are shown in FIG. 1, the voice channels are converted into amplitude modulated signals in five different, higher frequency ranges to provide, at their outputs carrier signals amplitude modulated by 60 voice channels.

By ten further conventional super group multiplexing means, only two of which, designated by the reference numerals 4 and 5, are shown in FIG. 1, the signals from the first group of multiplexers are further multiplexed to provide amplitude modulated carrier signals modulated by 600 voice channels.

By a conventional master group multiplexer 6, the outputs of the super group multiplexers, e.g. the super group comprising multiplexers 4 and 5, are further multiplexed to provide 170 amplitude modulated carriers which carry 600 channels of signal information.

Commencing at the super group level, it has been the practice to include pilot carriers for monitoring purposes, e.g. to indicate whether a multiplexer is not functioning or no modulating signals are being processed.

It has been the prior art practice to supply the output of the master group multiplexer 6 to wire or coaxial conductor lines for transmission to another station or to supply the output of the master group multiplexer to a microwave transmitter for modulating the output thereof. The disadvantages of such methods of transmission have been described hereinbefore.

In accordance with the invention, a group of amplitude modulated and multiplexed carriers are supplied to a frequency modulator 7, the output of which is employed to intensity modulate the output of an optical transmitter 8 coupled to one end a single mode optical fiber of an optical fiber cable 9 which contains a plurality of optical fibers. The opposite end of the optical fiber is coupled to an optical receiver 10, the output of which is supplied to a frequency demodulator 11 for converting frequency modulated signals at the output of the optical receiver 10 into amplitude modulated signals.

The group of amplitude modulated and multiplexed carriers may be supplied to the frequency modulator 7 from the master group multiplexer 6, as shown in FIG. 1, or may be supplied thereto from one or more of the other multiplexers or a combination of multiplexers provided, in the latter case, that the frequency ranges do not overlap. Also, more than one frequency modulator, similarly supplied with a group or groups of amplitude modulated and multiplexed carriers, may be connected to the optical transmitter provided that the outputs of the frequency modulators are separated in a known manner, e.g. by frequency. A typical nominal frequency for the output of the frequency modulator 7 may be 300 MHz.

The amplitude modulated carriers at the output of the FM demodulator 11 are supplied to a chain of demultiplexers which correspond to the multiplexers described but which function in a reverse manner. A typical station has a master group demultiplexer (DEMUX) 12, a group of super group demultiplexers, of which demultiplexers 13 and 14 are representative, and a group of group demultiplexers, of which demultiplexers 15 and 16 are representative. The analog signals at the outputs of group demultiplexers correspond to the voice and other signals supplied by the source 1 and are supplied to the recipients by conventional means represented by the block 17.

The optical transmitter 8 and the optical receiver 10 are known in the art and may, for example, be, respectively, a T1302 optical transmitter and an R1302 optical receiver manufactured and sold by Pirelli Optronic Systems, 300 Research Parkway, Meridan, Conn. 06450. Block and functional diagrams of such a receiver and such a transmitter are shown in FIGS. 2 and 3 respectively.

Figure 2:
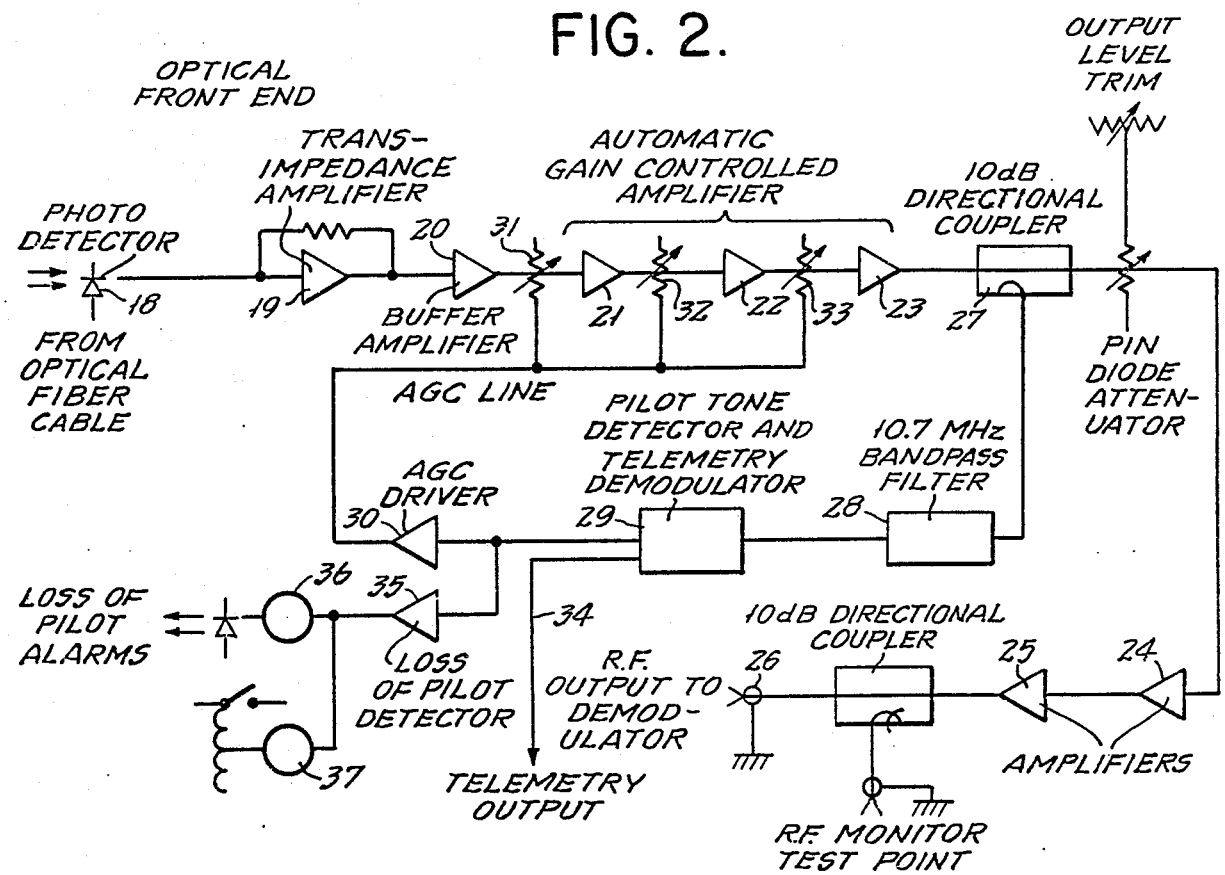
FIGS. 2 and 3 are schematic block diagrams illustrating, respectively, one type of an optical receiver and one type of optical transmitter which may be employed in the system of the invention.

As illustrated in FIG. 2, a photo detector 18 receives laser light, modulated in intensity, from an optical fiber in the cable 9, and the electrical output of the photo detector is processed through amplifiers 19–25 and supplied, after processing, to the output terminal 26 which is connected to the FM demodulator 11. The output of the amplifier 23 passes through a directional coupler 27 from which pilot tone and telemetry signal energy is abstracted and supplied to a band pass filter 28. The output of the filter 28 is supplied to a pilot tone detector and telemetry signal demodulator 29. Pilot tone signal information of the detector-demodulator 29 is supplied to an automatic gain control driver 30 which, as indicated schematically by the variable resistors 31, 32 and 33, controls the gain through the amplifiers 21–23 in accordance with the amplitude of the pilot tone signal. Telemetry signals of the detector-demodulator 29 are supplied to various control devices by way of the line 34 for purposes which will be discussed hereinafter.

A loss of pilot detector 35 is connected to the detector-demodulator 29 and is connected to devices 36 and 37 for indicating reception and lack of reception of the pilot tone signal.

Figure 3:
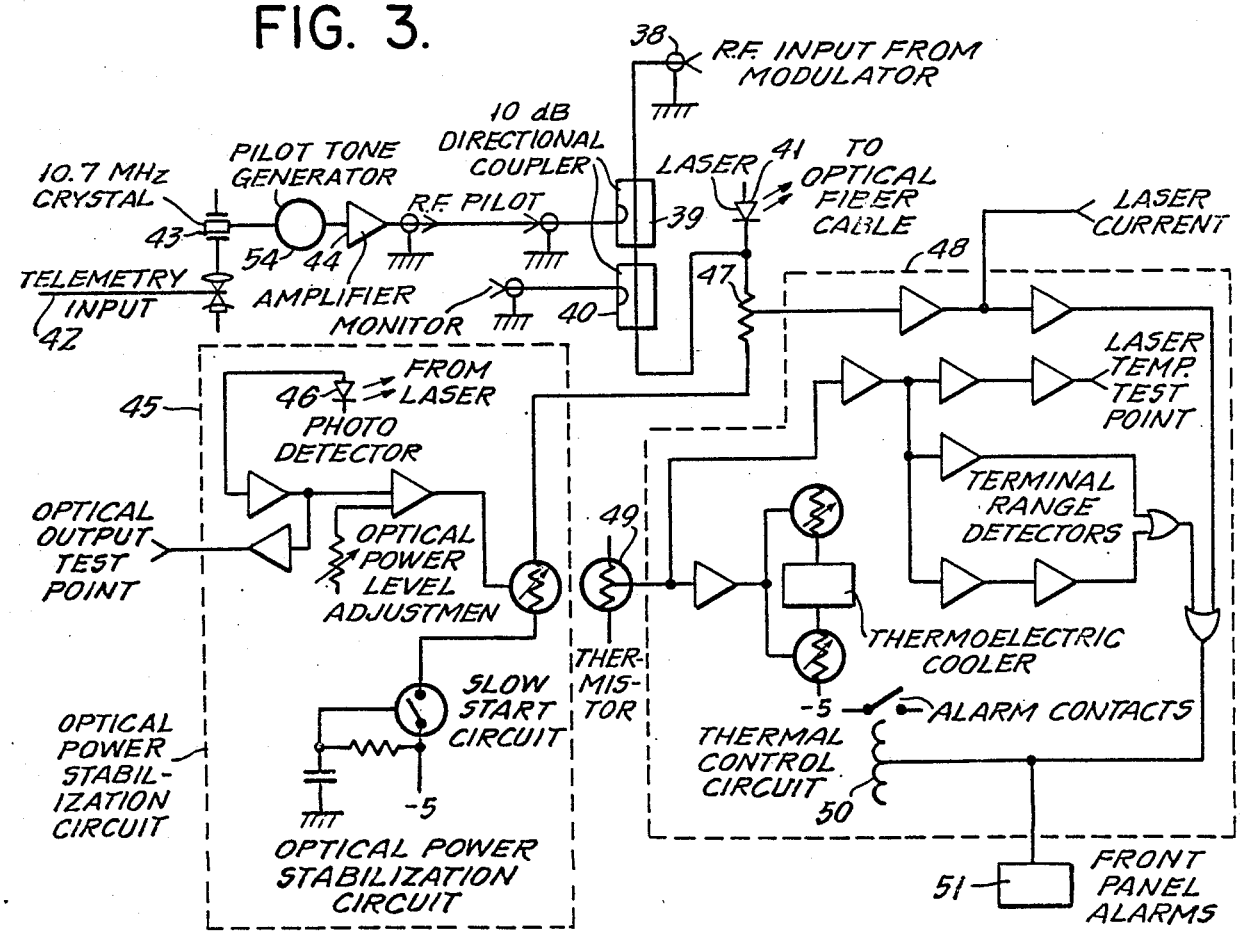

As shown in FIG. 3, the optical transmitter comprises an input terminal 38 to which the output of the FM modulator 7 (FIG. 1) is connected. The signal energy received at the terminal 38 passes through a pair of directional couplers 39 and 40 and is applied to a laser 41 to modulate its output in intensity. The output of the laser 41 is supplied to an optical fiber in the optical fiber cable 9 (FIG. 1).

Telemetry signals from conventional sources are supplied by way of a line 42 for the modulation of the output of an oscillator, the oscillator being represented by a crystal 43, and such oscillator output with the output of a radio frequency, tone modulated carrier generator 54 are supplied to the directional coupler 39 through an amplifier 44. Thus, the oscillator output and the pilot tone carrier are also supplied to the laser 41 and modulate its output.

The directional coupler 40 permits the withdrawal of a small amount of signal energy for monitoring purposes.

A circuit for measuring and controlling the power output of the laser 41 is diagramatically shown in the dotted rectangle 45 and includes a photo detector 46 for receiving laser energy from the laser 41 and conventional automatic and manual controls for adjusting the output level of the laser 41.

The electrical current of the laser 41 is indicated at a resistor 47 which is connected to a laser temperature control circuit diagramatically shown in the dotted rectangle 48. A thermistor 49, at the laser 41 provides information as to the temperature of the laser 41 to the temperature control circuit 48 which automatically controls the temperature of the laser 41, in a known manner, and operates alarm devices 50 and 51 in the event that the temperature of the laser 41 exceeds a safe temperature.

FIG. 1 illustrates a basic, one-way transmission system, and FIG. 4 illustrates a two-way transmission system for two stations 52 and 53. FIG. 4 illustrates an embodiment in which the station 53 is manned and the station 52 is unmanned, but it will be apparent that both stations could be manned. Like components are designated by the same reference numeral, the duplicate component having a suffix letter after the reference numeral.

Transmission of signals from the station 53 to the station 52 is accomplished by the optical transmitter 8a connected to an FM modulator 7a, a pilot tone carrier generator 54a and an optical fiber of the cable 9. The signals from the transmitter 8a are received by the optical receiver 10a and supplied to an FM demodulator 11a and the loss of pilot detector 35 as explained in connection with FIG. 2.

Transmission of signals from the station 52 to the station 53 is accomplished by the optical transmitter 8 connected to the FM modulator 7, the pilot tone carrier generator 54 and an optical fiber of the cable 9. The signals from the transmitter 8 are received by the optical receiver 10 and supplied to the FM demodulator 11 and to the alarm and telemetry circuits as explained in connection with FIG. 2.

In the event that the station 52 is unmanned, it is desirable to transmit information as to conditions at the station 52 to the manned station 53. Therefore, as indicated schematically in FIG. 4, signals indicating conditions at the station 52, such as loss of pilot, laser temperature, laser bias and other conditions indicated by sensors, e.g. fire sensors, unauthorized entry sensors, etc., are also supplied to the optical transmitter 8 for transmission to the optical receiver 10 which supplies the signals to alarm and telemetry circuits of the type described in connection with FIG. 2. In this way, the conditions at the unmanned station 52 can be monitored at the manned station 53.

As pointed out hereinbefore, the amplitude modulated signals at the output of the master group multiplexer 6 are not employed to directly modulate the output of the optical transmitter 8 or 8a. Instead, the amplitude modulated signals are converted, after the multiplexing, into frequency modulated signals and the latter signals are employed to modulate the output of the optical transmitter. The purpose of such conversion, which is an added step, is to improve the quality of signal transmission and reception. Thus, with frequency modulation and demodulation, the signal-to-noise ratio at the receiving end can be significantly improved, particularly since wide frequency modulation or deviation can be employed at the optical transmitter due to the use of an optical fiber to interconnect the stations. Frequency modulation to such an extent cannot be used in systems employing wire, coaxial conductor or microwave links for the reasons stated hereinbefore.

As a further means for improving the quality of signal transmission, a preemphasizer 55 and 55a may be included intermediate the source of amplitude modulated, multiplexed signals, such as the master group multiplexer 6, and the FM modulator 7 and 7a for emphasizing certain frequencies and thereby improving the power transmitted at such frequencies and hence, the signal-to-noise ratio. Of course, when such a preemphasizer, 55 and 55a, is used, the signals are subjected to deemphasis at the receiving end, such as by the deemphasizers 56 and 56a.

A typical preemphasis graph for the frequency range from 123.56 KHz to 6178 KHz is illustrated in FIG. 5. The deemphasis graph would be the inverse of what is shown in FIG. 5.

As indicated in FIG. 5, the signals at frequencies from 1853.4 KHz to 3861.25 KHz are emphasized as compared to lower frequencies, the multiplexed carriers bearing the desired signals being in the range from 123.56 to 3861.25 KHz. However, the signals at frequencies above 3861.25 KHz are attenuated with respect to the signals at 3861.25 KHz so as to attenuate noise signals and undesired harmonics.

Although preferred embodiments of the present invention have been described and illustrated, it will be apparent to those skilled in the art that various modifications may be made without departing from the principles of the invention.

I claim:

1. In a multiplex transmission system having a plurality of sources of analog signals connected to multiplexing means for providing at least one group of amplitude modulated continuous signals at different frequencies, the combination therewith of:
   a frequency modulator connected to said multiplexing means for converting said group of amplitude modulated continuous signals into a group of frequency modulated continuous signals;
   an optical transmitter connected to said frequency modulator for intensity modulation of the optical signal output of said optical transmitter by said group of frequency modulated continuous signals;
   an optical fiber cable connected at one end to said optical transmitter for transmitting the optical signals at the output of said optical transmitter;
   an optical receiver connected to said optical fiber cable for receiving optical signals from said optical transmitter; and
   a frequency demodulator connected to said optical receiver for demodulating the signals at the output of said optical receiver.

2. The combination as set forth in claim 1 wherein said multiplexing means comprises a plurality of multiplexing means, each of said plurality of multiplexing means being connected to a plurality of sources of analog signals, wherein said plurality of multiplexing means is connected to a further multiplexing means and wherein said frequency modulator is connected to said further multiplexing means.

3. The combination as set forth in claim 1 further comprising demultiplexing means connected to said frequency demodulator for demultiplexing the signals at the output of said frequency demodulator and converting the latter signals to said analog signals.

4. The combination as set forth in claim 1 further comprising a preemphasizer connecting said frequency modulator to said multiplexing means for emphasizing some of said amplitude modulated signals relative to others of said amplitude modulated signals and a deemphasizer connected to the output of said frequency demodulator for deemphasizing said some of said amplitude modulated signals.

5. The combination as set forth in claim 1 further comprising:
   a further plurality of sources of analog signals connected to further multiplexing means for providing a further group of amplitude modulated continuous signals at different frequencies;
   a further frequency modulator disposed at the location of said optical receiver and connected to said further multiplexing means for converting said further group of amplitude modulated continuous signals into a further group of frequency modulated continuous signals;
   a further optical transmitter disposed at the location of said further frequency modulator and connected to said further frequency modulator for intensity modulation of the optical signal output of said further optical transmitter by said further group of frequency modulated continuous signals,
   said optical fiber cable being connected at one end to said further optical transmitter for transmitting the optical signals at the output of said further optical transmitter;
   a further optical receiver disposed at the location of the first-mentioned said optical transmitter and connected to said optical fiber cable for receiving optical signals from said further optical transmitter; and
   a further frequency demodulator connected to said further optical receiver for demodulating the signals at the output of said further optical receiver.

6. The combination as set forth in claim 5 further comprising generating means for generating a pilot tone modulated carrier, means connecting said generating means to said further optical transmitter for intensity modulating the optical signal output of said further optical transmitter by said carrier, detecting means connected to said further optical receiver for indicating the presence and the absence at said further optical receiver of said pilot tone modulated carrier, and monitoring signal means responsive to said detecting means for providing a monitoring signal and connected to the first-mentioned said optical transmitter for modulating the output of the first-mentioned said optical transmitter with said monitoring signal.

7. The combination as set forth in claim 6 further comprising physical condition measuring sensors disposed at the location of the first-mentioned said optical transmitter for measuring physical conditions at the last-mentioned said location and means connected to said sensors and the first-mentioned said optical transmitter for modulating the output of the first-mentioned said optical transmitter in accordance with the physical conditions measured by said sensors.

8. In a telephone system in which analog signals are transmitted from a first station to a second station over an optical fiber cable, said first station comprising a plurality of sources of analog signals connected to multiplexing means for providing at least one group of amplitude modulated continuous signals at different frequencies, and an optical transmitter connected to one portion of said optical fiber cable for supplying the signals at the output of said optical transmitter to said one portion of said optical fiber cable and said second station comprising an optical receiver connected to another portion of said optical fiber cable for receiving optical signals from said optical transmitter and demultiplexing means for demultiplexing signals received by said optical receiver, the improvement comprising:
   a frequency modulator at said first station and connected to said multiplexing means for converting said group of amplitude modulated continuous signals into a group of frequency modulated continuous signals and connected to said optical transmitter for intensity modulating said signals at the output of said optical transmitter with the group of frequency modulated continuous signals; and
   a frequency demodulator at said second station and connected to said optical receiver and to said demultiplexing means for converting the signals received by said optical receiver into amplitude modulated signals and supplying the latter said signals to said demultiplexing means.

* * * * *